Feb. 23, 1971           A. M. KING           3,565,641

COFFEE BREWING MACHINE

Filed April 8, 1968           4 Sheets-Sheet 1

*INVENTOR*
Alan M. KING

*ATTORNEY*

Feb. 23, 1971  A. M. KING  3,565,641

COFFEE BREWING MACHINE

Filed April 8, 1968  4 Sheets-Sheet 3

INVENTOR
Alan M. KING

ATTORNEY

Feb. 23, 1971 A. M. KING 3,565,641
COFFEE BREWING MACHINE
Filed April 8, 1968 4 Sheets-Sheet 4
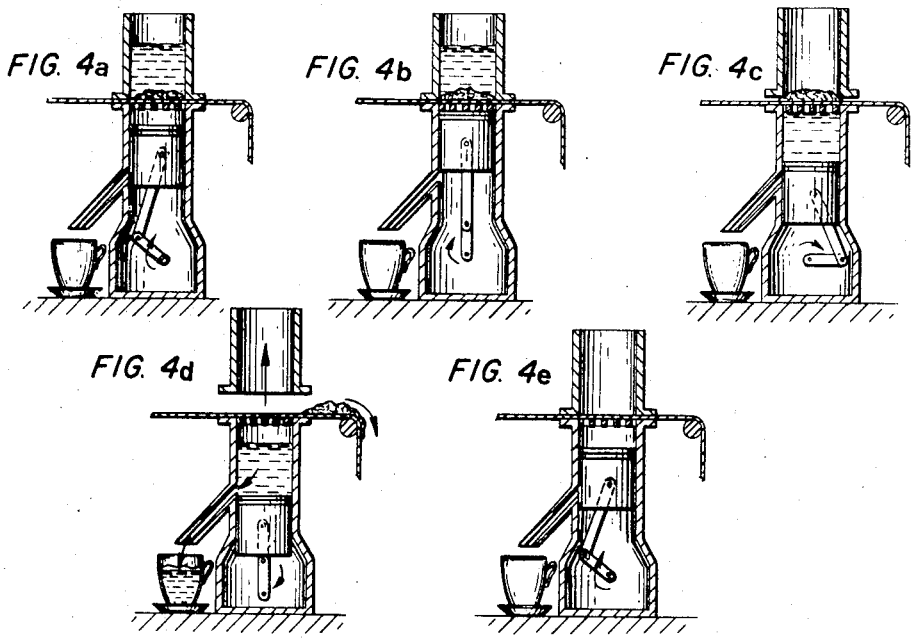
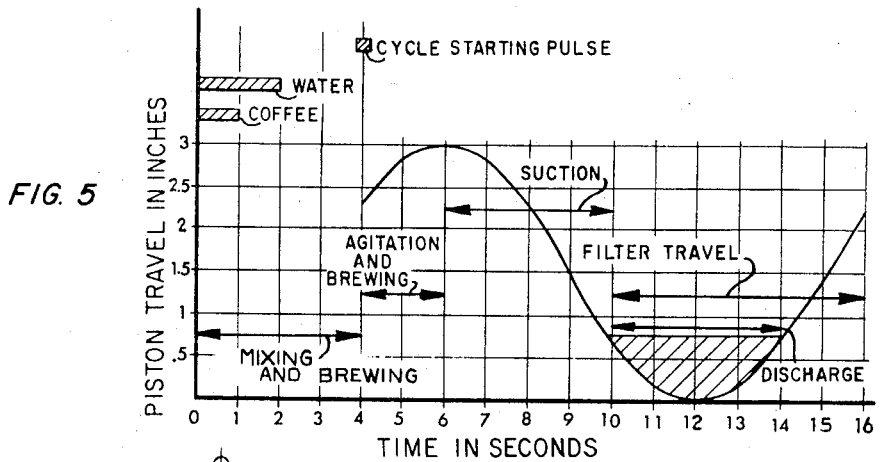
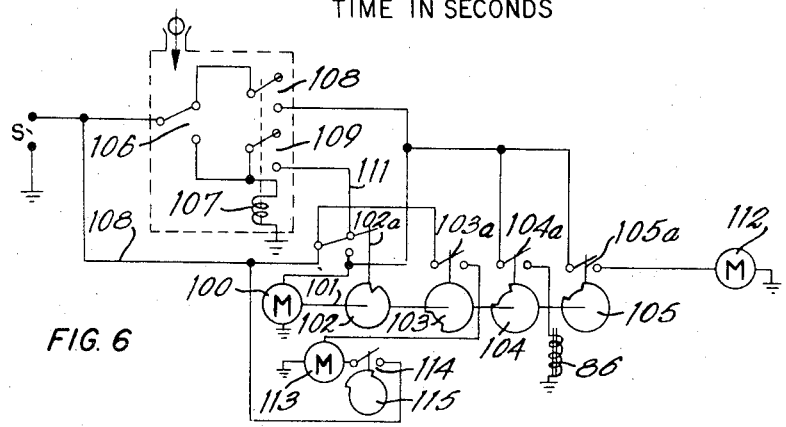
INVENTOR
Alan M. KING
ATTORNEY

United States Patent Office 3,565,641
Patented Feb. 23, 1971

3,565,641
COFFEE BREWING MACHINE
Alan M. King, 4746 The Boulevard,
Westmount, Quebec, Canada
Continuation-in-part of application Ser. No. 591,816,
Nov. 3, 1966. This application Apr. 8, 1968, Ser.
No. 719,499
Int. Cl. A47j 31/043
U.S. Cl. 99—302                    16 Claims

ABSTRACT OF THE DISCLOSURE

An apparatus for brewing a single cup of beverage which has a chamber for receiving hot water and beverage material. The chamber has a floor permeable to gas and liquid and impermeable to the beverage material. The apparatus includes a second chamber located below the first chamber with a piston therein. Movement of the piston toward the floor of the first chamber forces air through the floor into the first chamber to agitate and brew the hot water and beverage material mixture to produce the beverage. Movement of the piston away from the floor withdraws the beverage through the floor to dispense it.

---

This application is a continuation-in-part of application Ser. No. 591,816, filed Nov. 3, 1966.

The present invention relates to an apparatus for brewing a beverage from hot water and ground beverage material, and particularly, although not exclusively, to the automatic brewing of coffee. The invention has special application to the automatic brewing of fresh coffee or other similar beverages such as, for example, tea, in single cup quantities in coin operated vending machines.

Coffee vending machines in current use generally brew a substantial quantity of coffee and store it in heated containers in readiness for dispensing. If one such container is not emptied within a brief period of time, the coffee becomes stale and bitter.

Proposals have been made to design machines to brew a single cup of coffee at a time. Some such machines employ powdered soluble or "instant" coffee which is merely mixed with hot water and the quality of such coffee is generally poor. In other cases, the coffee has to be brewed in an unusually short period of time to avoid dissatisfaction by customers who must wait in line to operate the machine. In order to extract the correct quantity of solubles economically under ambient pressure conditions, the coffee must be maintained in contact with the hot water for at least a short period of time. In home brewing or batch brewing, this time is normally of the order of several minutes. The brew period may be reduced by increasing the concentration of coffee grounds per cup, but this is naturally uneconomical. Furthermore, the extraction so produced is "unbalanced" in the sense that certain solubles are present to excess and others are absent, leading to a bitter taste.

In order to speed up the cycle of operation, a single cup machine is known which uses excess pressure, for example, by means of an applied piston or air or water pressure to force hot or super-heated water through ground coffee into the cup. Such methods are undesirable in that less than the correct percentage of solubles is extracted leading to bitter and unpalatable coffee. This is due to the fact that the first increment of water passes rapidly through the grounds before they have time to swell and extracts little, if any, coffee solubles. Again, the practice is to add more than the correct amount of coffee grounds leading to unbalanced liquor and uneconomical extraction.

It is an aim of the present invention to provide a method and apparatus for brewing coffee or a similar beverage in which the disadvantages above are substantially reduced and in which, nevertheless, the coffee can be brewed in small quantities, for example, single cup quantities within a feasible period of time, for example, 12 to 14 seconds. In accordance with the invention, the coffee is brewed by first forcing air through the hot water and beverage material to agitate them to ensure better extraction of the solubles in the ground material and then extracting the beverage through a filter.

More particularly, the invention is directed toward an apparatus for brewing a beverage from hot water and ground beverage material comprising:

(a) Supplying a predetermined amount of said material and hot water which is at a brewing temperature to a chamber having a floor which is permeable to gas and liquid and impermeable to said material, (b) Forcing air through the floor into the chamber to agitate the mixture of hot water and material for a predetermined time, and (c) Withdrawing the brewed beverage through the floor of the chamber.

It has been found that the agitation step during which air is forced through the mixture of water and material during the brewing of the beverage leads to a surprising and unexpected acceleration of the extraction of beverage solubles during the brewing process. The mechanism of this accelerated brewing is not fully understood. It may be due to a catalytic action of the air being forced through the ground material and/or localized pressure gradients and/or to a chemical interaction.

The invention further relates to an apparatus for brewing a beverage from hot water and ground beverage material. The apparatus includes a chamber for receiving a mixture of hot water and ground beverage material, the chamber having a floor at least a partial area of which is permeable to gas and liquid and impermeable to said beverage material, characterized in providing means for forcing air into the chamber through the floor to agitate the mixture in the chamber and including further means for withdrawing the beverage from the chamber through the floor.

Having thus generally described the invention, a preferred embodiment is hereafter described in greater detail, illustrating the preferred method of operation, with reference to the accompanying drawings, in which:

FIG. 2a is a part section along the line 2a—2a of FIG. 3;

FIGS. 4a, 4b, 4c, 4d and 4e are diagrammatic views of the brewer unit, illustrating the position of the components during different stages in the cycle of operation;

FIG. 5 is a graph of piston travel against time, illustrating the timing of the various operations of the machine; and FIG. 6 is a circuit diagram of the operating means.

Figure 1:
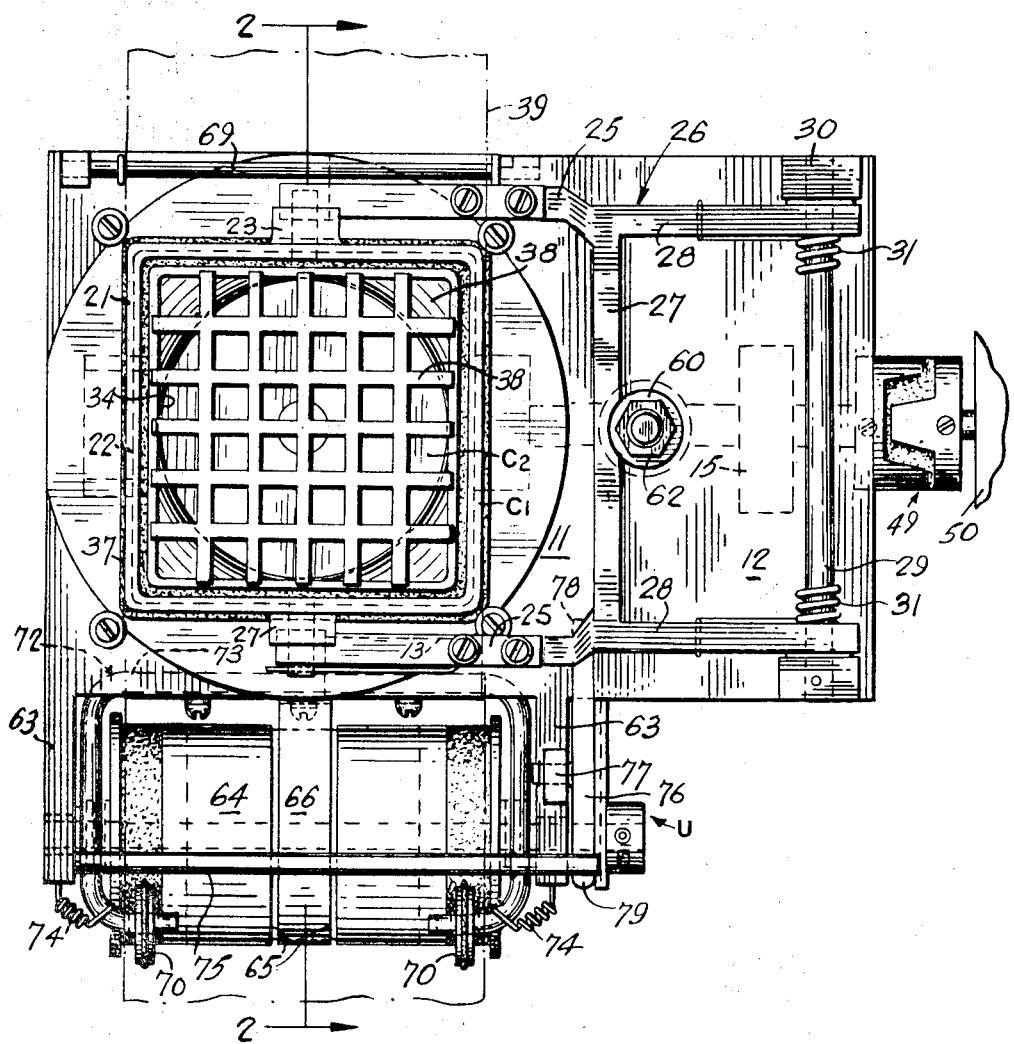
FIG. 1 is a plan view of the brewer unit of a single cup coffee vending machine in accordance with the present invention.
Figure 2:
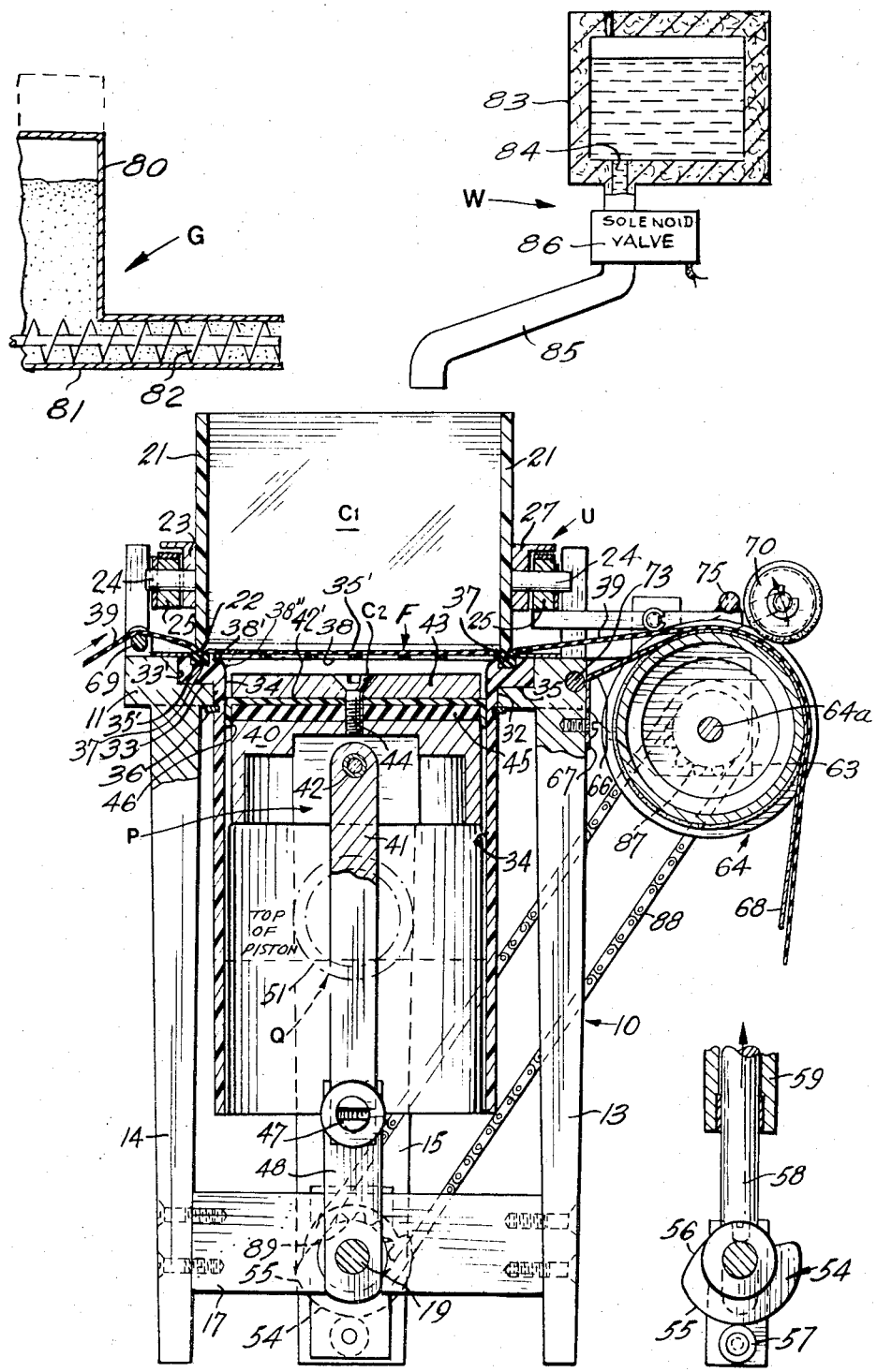
FIG. 2 is a vertical cross-section along the line 2—2 of FIG. 1, illustrating also the means for passing aliquots of ground coffee and aliquots of water to the brewer unit.

Referring to the drawings, the principal components of the machine are best illustrated in FIG. 2 where there is shown a brewer unit U which is constructed to provide a brew chamber C1, preferably open at the top to the atmosphere. A coffee dispenser G and water dispenser W supply controlled or measured amounts of hot water, at a suitable brewing temperature, and coffee grounds to the brew chamber C1. The brew chamber C1 is provided with a floor F which is permeable to liquid and air, but impermeable to the coffee grounds and which divides chamber C1 from a second chamber C2 underneath. Means, such as a piston P, are provided in the second chamber C2 for producing both an increased and decreased pressure in the second chamber C2 with respect to the pressure in the brew chamber C1 to cause both agitation of the hot water and coffee grounds and extraction of the brewed coffee from the brew chamber through the floor. An outlet Q is provided in the wall of the second chamber C2 at a spaced location from the floor and cooperates with the piston P to constitute means for dispensing the extracted liquid from the second chamber. Further means are provided for removing the used coffee grounds from the permeable floor F to ready the machine for the next brewing cycle. The apparatus is incorporated in a vending machine and operating means, to be described, and controlled by insertion of a coin in the machine, are provided to actuate the various components to brew and dispense a single cup of coffee in a single continuous cycle.

The brewer unit U comprises a base structure 10 of machined metal having a brewer platform 11, and an extension platform 12 integral therewith. The platforms 11 and 12 are supported upon spaced vertical legs 13, 14 and 15. Front leg 13 and rear leg 14 depend from platform 11 and are interconnected near their lower ends by a bearing strut 17. Leg 15 depends from platform 12 centrally between legs 13, 14 and to one side of them and itself contains a bearing horizontally aligned with a bearing in strut 17, the bearings mounting a horizontal drive shaft 19 to be further described.

The upper chamber C1 is formed in part by an open tubular member 21 which may be of plastics material such as acetal resin, for example, as sold under the registered trademark "Delrin." The tubular member 21 is rectangular, preferably square in cross-section, with a square bottom edge 22. The tubular member may also be cylindrical in shape. Alternatively, the member 21 may be essentially cylindrical in cross-section with the lower portion undergoing transition to form a rectangular edge or the square edge 22. Stubs 23 extend from opposed sides of the member 21 and constitute mountings for a pair of stub axles 24 which are pivotally mounted at the ends of fork limbs 25 of a supporting frame 26. The frame 26 includes a web 27 joining the limbs 25 and a further pair of oppositely directed limbs 28 which are pivotally mounted at the end remote from member 21 on an axle 29. The axle 29 is supported between uprights 30 which extend a short distance upwardly from the extension platform 12 at each side of the machine. Coil springs 31 are arranged around the axle 29 and tend to urge the frame 26 and the member 21 to a raised tilted position shown in dotted lines in FIG. 3, clear from the platform 11.

The platform 11 has a central aperture 32 directly beneath the lower edge 22 of member 21 with a shoulder 33 formed about the periphery of the aperture. The aperture 32 is circular while the wall 33' defining the shoulder 33 forms a square. The lower chamber C2 is constituted in part by a second open cylinder 34 of similar material to member 21, and which is provided with a square flange 35 at its upper end. The square flange is constructed to seat on the shoulder 33 with the cylinder 34 passing through the aperture 32. A split ring 36 clamps the cylinder 34 in position against the undersurface of the platform 11. The flange 35 is formed in its upper surface with a square groove 35', aligned below the bottom edge 22 of member 21 when in its lower position and seated within the groove is a seal 37 of rubber or resilient plastics material. The seal 37 stands flush with the platform 11 so as to constitute a seal for the lower edge 22 of the member 21 when it presses down on the platform. Inwardly of the seal 37, the flange 35 is formed with a square recess 38' which receives a perforated square plate 38. The inner surface of the cylinder 34 adjacent floor F merges smoothly from a circular cross-section to the square recess along surface 38". The plate 38 constitutes part of the floor F, and acts as a support for a filter 39 which constitutes the remainder of the floor F. The filter preferably is in the form of a continuous strip and can be filter paper, micromesh metal screen or any other well known filter material suitable for filtering the beverage being brewed. The floor F can, in a further embodiment, comprise a replaceable micromesh metal screen which acts both as a support for the coffee grounds and as a filter material thus eliminating the necessity of using the perforated square plate 38. As shown in FIG. 2, the tubular member 21, in its lower position, is adapted to clamp the filter strip 39 against the seal 37. When clamped against the floor F, the floor and member 21 form upper brew chamber C1. The floor F and cylinder 34 form the second chamber C2. It will be understood that if the lower edge 22 of the tubular member 21 forming the upper chamber is rectangular or even circular in shape, then the flange 35 of the lower cylinder 34, the groove 35' and the seal 37 will be similarly shaped so as to provide a proper seal fit when the edge 22 is clamped against the floor.

The piston P is arranged to slide within the circular portion of the lower cylinder 34. The piston comprises a piston head 40, conventionally recessed in its lower surface to receive the end of a connecting rod 41 which is generally mounted within the recess through a crank pin 42. The piston head 40 is arranged as a loose fit within the cylinder 34. A cap washer 42' of a resilient self-lubricating plastics material such as tetrafluoroethylene, fits over the top of the piston head 40 and is held in place by a circular plate 43 secured to the piston head 40 by a countersunk bolt 44. Between the cap washer 42' and the piston head is a resilient, for example, rubber, washer 45 of substantial thickness, for example, 1/8" and having a chamfered upper edge. The plate 43 compresses the rubber washer 45 and so forces the rim 46 of the cap washer 42' into sealing engagement against the inner surface of cylinder 34.

Figure 3:
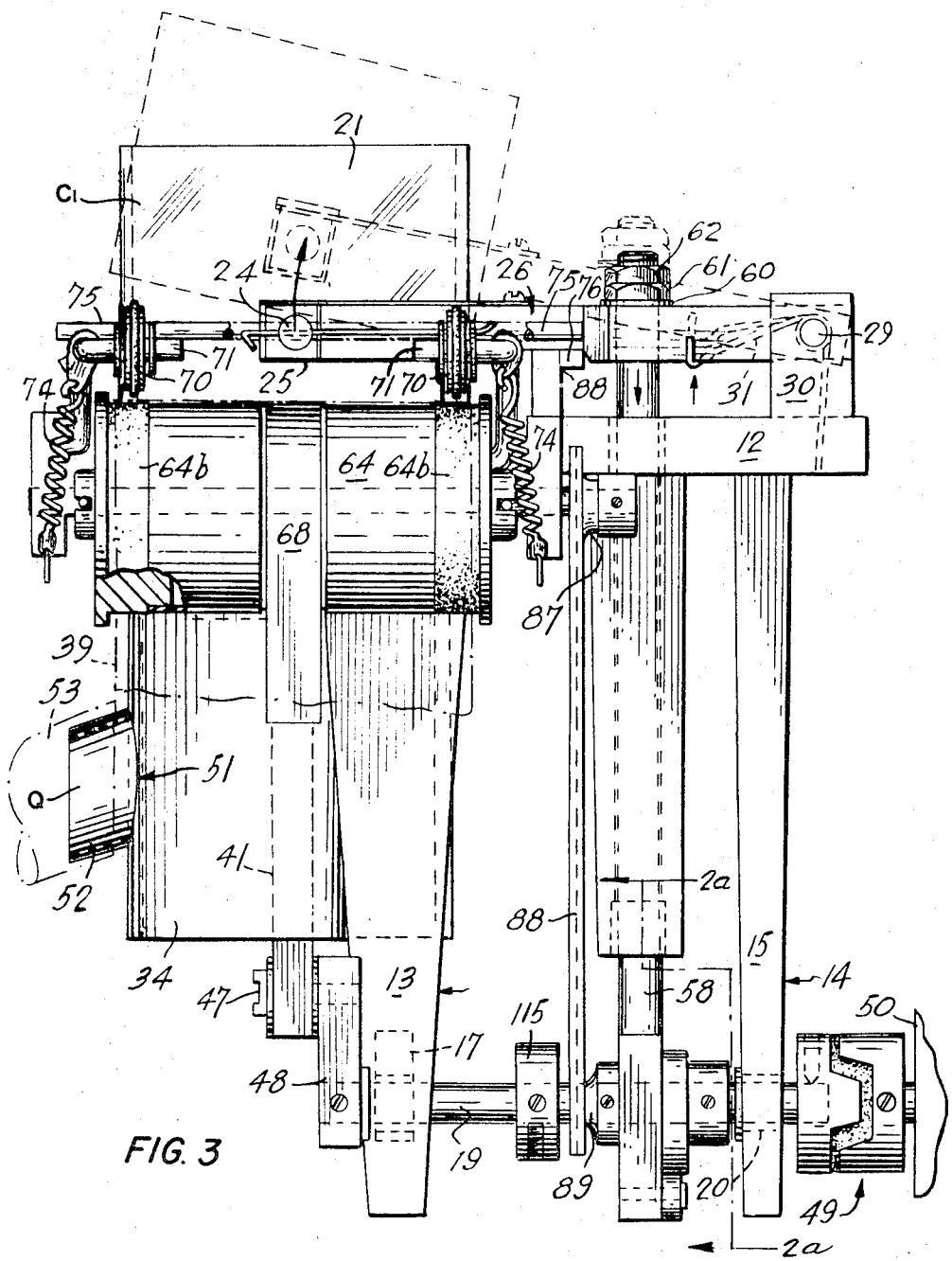
FIG. 3 is a side elevation of the brewer unit of FIG. 1 viewed from a position at the bottom of FIG. 1.

The lower end of the connecting rod 41 is connected by a crank pin 47 to a crank 48 secured to one end of the drive shaft 19 as shown best in FIG. 3. The drive shaft 19 is connected through a flexible coupling 49 to a reduction gear box 50 driven by an electric motor (not shown). Energization by the motor causes rotation of the drive shaft 19 causing reciprocating motion of the piston P within the cylinder 34.

In the wall of the cylinder 34 nearer its lower end is arranged a discharge aperture 51 around the outside of which projects a spout 52 to which may be fitted, if desired, a flexible tube 53, to direct the discharged coffee liquor to a suitable position for filling coffee cups.

The aperture 51 and spout 52 constitute discharge means generally indicated at Q. The aperture 51 is so located with respect to the piston stroke that when the top of the piston is aligned with the top of the outlet 51, the volume defined between the top of the piston and the floor is sufficient to hold the contents of a cup of coffee. When the piston P is in the bottom dead-center position of its stroke as indicated in dotted lines in FIG. 2, the outlet 51 is substantially or entirely uncovered.

Mounted to the drive shaft 19 at a position below the extension platform 12 is a cam 54 (FIG. 2a). The cam 54 has a large radius 55 covering approximately 240° and sloping to a low radius 56 covering the remaining circumference. A cam follower roller 57 is located under and in contact with the cam surfaces 55 and 56 and mounted to a reciprocating rod 58 which is slidingly supported in a bearing member 59 depending from and mounted to the platform 12. The upper end of the rod 58 is threaded to receive a washer 60, an adjusting nut 61 and a lock nut 62. The washer 60 is arranged as shown in FIG. 3 to engage the top surface of the web 27 of the supporting frame 26 for the tubular member 21. When large radius 55 is in contact with the cam follower 57, as shown in the figures in plain lines, the frame 26 is held down against the springs 31 so that the tubular member 21 is in sealing engagement against the floor F. As the cam follower 57 rides over the small radius 56, the springs 31 raise the frame 26 and the member 21 to the position shown in dotted lines in FIG. 3. As shown in FIG. 4, the member 21 is raised only when the piston P is moving through a portion of its cycle centered around the bottom dead center position, at which time the outlet 51 is uncovered.

Means are provided for removing the used coffee grounds from the floor F when tubular member 21 is raised. In the preferred embodiment, these means include bracket arms 63 which extend from the front of the platform 11 and support the axle 64a of a drum 64, constructed, for example, of a plastic tube fitted to end castings provided with a roughened or knurled exterior surface 64b of cast aluminum. The drum is of sufficient length to cover the entire width of the perforated portion of the plate 38 and seal 37. The drum 64 has a central peripheral recess 65 of sufficient width and depth to receive a lightly sprung or hinged strip 66 which is mounted at its rear end 67 to the frame 11, with its front end 68 bent over the drum 64 along the recess 65 for the purpose of preventing the filter strip 39 from wrapping under the drum. The filter strip 39 is fed in the direction of the arrow in FIG. 2 from a supply roll (not shown) over a guide rod 69 raised slightly above the level of the floor F, over the seal 37 and plate 38 and over the strip 66 and drum 64. In use, the drum 64 extends over a waste container which is not shown. The axle 64a of the drum 64 is driven from a sprocket wheel 87 connected by chain 88 with a second sprocket wheel 89 mounted on the drive shaft 19, so that the drum is continually rotated so long as the drive shaft 19 is in motion.

Pulley wheels 70 are arranged to press the filter strip 39 into contact with the knurled end regions of the drum 64 during the time that the frame 26 and member 21 are in their raised position. The pulleys 70 are mounted on the inwardly turned horizontal limbs 71 of a wire frame 72. The web 73 of the frame is journally mounted in a bore in the platform 11 and the limbs 71 are urged downwards by springs 74 so as to tend to press the pulleys 70 into contact with the filter strip 39 and press this into engagement with the drum 64. A cross-bar 75 is welded across the limbs 71. A rocker lever 76 pivoted intermediate its length to a mounting 77 rigid with one of the supports 63 as its rear end 78 passed under the front limb 25 of the rocking frame 26, and its front end 79 passed under the cross-bar 75. With the frame 26 in its lower position, the front end 79 of the rocker bar 76 is raised, lifting the cross-bar 75 against the action of the spring 74 to raise the pulley wheel 70 out of contact with the filter strip 39. Thus, the filter strip 39 is only enabled to move by contact with the drum 64, when the frame 26 and member 21 are in their raised position, relieving the pressure on the cross-bar 75. In this raised position the filter paper under tension between the drum 64 and guide 69 rises away from the plate 38, breaking the surface tension adhering it thereto, and allowing air to pass underneath through the plate 38 into chamber C2.

As illustrated in FIG. 2, the machine, in addition to the brewing unit U, includes a coffee dispenser G for adding measured amounts of ground coffee into the upper chamber C1. A typical conventional device is shown and includes a hopper 80 having a horizontal cylindrical spout 81 directed over the open top of the upper chamber C1. A conveyor screw 82 which may be in the form of a coiled wire and which acts in the manner of an Archimedes screw is passed through the spout and under the coffee grounds stored in the hopper 80, the screw being turned by means of a motor (not shown) in order to carry a predetermined amount of coffee along the spout 81 and into the chamber C1. The machine is also inclusive of means for admitting to the chamber C1 aliquots of hot water at a temperature high enough for brewing.

The water temperature preferably is in the range between 195° F. and 200° F. The water dispenser W includes a lagged hot water tank 83 in which water is maintained by conventional thermostatic means at near boiling temperature. The tank 83 is provided with an outlet 84 at its lower end from which a pipe 85 leads a sufficient amount of hot water to brew a single cup of coffee into the top of the chamber C1. A solenoid valve 86 is provided in the pipe 85 to control the admission of water.

The machine is also inclusive of operating means including a timer circuit illustrated in FIG. 6. With reference to FIG. 6, there is shown a timer motor 100 having shaft 101 to which is connected a plurality of cams 102, 103, 104 and 105, arranged to operate respective cam switches 102a, 103a, 104a and 105a. The cams are indicated in position at the start of a brewing cycle. A live source S is provided having one end connected to ground and the live terminal connected to the pole of a two-way coin operated impulse switch 106. The normally disengaged contact switch 106 is connected to the coil of a double pole relay 107, the other end of which is grounded and also to the pole of one contact switch of the relay. Thus, an impulse from switch 106 energizes the relay 107 after which a holding circuit provided through the relay contact switch 109 and switch 102a holds the relay closed. The timer motor 100 is then energized through the second relay contact switch 108, the pole of which is connected to the normally engaged contact switch 106. Simultaneously, the solenoid valve 86 governing the water admission is energized through cam switch 104a and the coffee motor 112 is energized through cam switch 105a. The coffee motor 112 and then the solenoid 86 are deenergized after predetermined periods in dependence upon the shape of the cams 104, 105 to provide the requisite aliquots of water and coffee. After a predetermined period of time after the water has been added, normally about 1½ or 2 seconds, the brewer unit motor 113 is energized through cam switch 103a.

Once the brewer motor has been energized, a cycle switch 115 operated by a cam mounted upon the drive shaft 19 provides an alternative source of current, after switch 103a has been opened again by the timer motor, and this alternative source continues to supply the brewer motor until the end of a cycle when the alternative supply is broken, again by cycle switch 115. The timer motor 100 is de-energized by cam switch 102a after completion of the addition of water and coffee aliquots. The breaking of switch 102a breaks the holding circuit for the relay. The timer cams are stopped in the correct position for the start of the next cycle.

The operation of the machine is illustrated more particularly with regard to FIGS. 4a to 4e and FIG. 5. At the commencement of the cycle, with the cams in the position shown in FIG. 6, the top of the piston is in the position indicated in FIG. 4a, that is, in an intermediate position on the upstroke a little above the mean position of the piston and above the outlet spout. It will be appreciated that the FIGS. 4a to 4e are diagrammatic, the outlet spout being shown on a different side of the unit for the sake of clarity. The tubular member 21 is seated on the floor, clamps the filter strip, and forms with the floor, the upper brew chamber. As shown in FIG. 5, the first operation to commence is the simultaneous addition of water and coffee. The water addition takes about 2 seconds and the coffee addition approximately 1 second. The brewer motor preferably is then started approximately 2 seconds after the water has been added as indicated by the position of the cycle starting pulse in FIG. 5, due to the shape and position of the cam 103. The duration of time, while the water is being added, and before the brewer motor operates, is not long enough time to permit any serious loss of water through the filter strip. Operation of the brewer motor causes the piston to move up forcing air through the water and coffee mixture to agitate them.

As previously explained, forcing air through the mixture greatly accelerates the brewing and allows an optimum percentage of the solubles to be extracted in the time allowed. The brewing temperature ranges between 188° F. and 199° F., preferably between 185° F. and 195° F. This upward motion takes approximately 2 seconds as shown in FIG. 5. The piston reaches top dead-center (FIG. 4b) and starts its downstroke. During the downstroke, a sub-atmospheric pressure is provided in the chamber C2 drawing the extracted coffee liquor from brew chamber C1 through the permeable floor F into chamber C2.

It has been found preferable to provide a floor F having as large an area as possible dependent on the size of the lower chamber necessary to receive the required amount of coffee to be dispensed in a single brewing operation and, when using the piston to withdraw the coffee, dependent on the stroke of the pitson required to withdraw the coffee. The larger the area of the floor, the thinner the layer of coffee grounds formed on the floor surface during coffee withdrawal. With a thin layer of coffee grounds, the coffee liquor can be withdrawn more easily and thus more quickly into the lower chamber speeding up the coffee vending process. For this reason, it is preferable to use a square or rectangular shape for the floor rather than a circular shape which matches the shape of the lower cylinder. The quadrilateral floor shape provides an unexpected decrease in the length of time required to withdraw the coffee using a piston downstroke and with other things being equal, over and above that which would be normally expected in increasing the floor area by changing its shape from a circle having a diameter D to a square shape having sides of length D.

The volume of the chamber C1 and the volume of chamber C2 above the coffee outlet 51 are such that all the coffee liquor is withdrawn into chamber C2 before the top of the piston P is on a level with the top of the outlet 51 during its downstroke (FIG. 4c). Preferably, the volume of chamber C2 is twice the volume of the beverage being brewed. The downstroke to this point takes approximately 4 seconds in the cycle of the piston. When the top of the piston P starts to uncover the outlet 51, the coffee liquor is passed out of the chamber into a cup provided at the end of the tube 53. Discharge is assisted by the admission of air into chamber C2. This is caused by the cam 54 raising the frame 26, member 21 and filter strip 39 away from its sealing engagement with the perforated plate 38, so that air is allowed to pass through the plate 38 into chamber C2 (FIG. 4c). The member 21 is raised approximately 6 seconds after commencement of operation of the brewer motor. When the member 21 is raised, all the coffee liquid has been withdrawn into the lower chamber. As the member 21 is raised, the pulleys 70 press the filter strip 39 against the drum 64, and the waste grounds are drawn out from under the member 21 and over the drum 64 into the waste container (not shown), presenting a fresh area of filter strip over the perforated support 38 (FIG. 4e). Filter travel takes approximately 6 seconds. The time for discharging the liquid through the tube 53 takes approximately 4 seconds. Discharge and filter travel begin substantially simultaneously as shown in FIG. 5. During discharge and filter travel, the top of the piston moves down to its bottom dead-center position and up again just past its mean position to the position the piston cycle started at as shown in FIG. 4e. As already described, the timer cycle comes to an end upon breaking of the cam switch 102a after the water and coffee have been added, the brewer motor being continued by the alternative cycle provided through the cycle switch 115. The cycle switch 115 brings the brewer motor 113 to a halt at the starting position illustrated in FIG. 4e ready for the next cycle.

It will be apparent that the present method and apparatus provide a rapid means for brewing single cup aliquots of coffee, the whole cycle from insertion of the coin taking only about 16 seconds. At the same time, the coffee is of an extremely high quality while providing an optimum extraction of the percentage of solubles in the coffee, the quality of the coffee being fully comparable with the best produced batch brewed coffee.

It will be apparent that, if desired, the cycle could be carried out in approximately 12 seconds by commencing operation of the brewing motor at the same instant that the addition of water and coffee is commenced, or by commencing operation of the brewer motor at the instant the addition of water is ended, in approximately 14 seconds.

It will be further apparent that many modifications may be made within the scope of the invention as defined in the following claims. Although the method and apparatus are particularly suitable for coffee brewing, it will be apparent that tea and other similar beverages may be automatically brewed in the same way. Again, while the piston and cylinder of the illustrated apparatus are preferred, other means such as pumps and valves may be used to provide the sub-atmospheric and super-atmospheric pressures.

I claim:

1. An apparatus for brewing a beverage including a chamber, the chamber having a floor, at least a partial area of which is permeable to gas and liquid and impermeable to ground beverage material, means for supplying hot water and ground beverage material directly to the first chamber, and means, separate from the supply means, operable in sequence, for forcing air into the chamber through the floor to agitate the mixture of ground beverage material and hot water in the chamber and then for withdrawing the beverage from the chamber through the floor and control means for operating the means supplying hot water and ground beverage material and the means for forcing air into the chamber and withdrawing the beverage, in sequence.

2. An apparatus as claimed in claim 1 including a second chamber located beneath the first chamber and separated therefrom by the floor, said second chamber receiving the beverage withdrawn from the first chamber and having means to dispense the beverage therefrom.

3. An apparatus as claimed in claim 2 wherein the means for forcing the air into the first chamber and then withdrawing the beverage from the first chamber through the floor comprise a piston movable up and down in the second chamber toward and away from the floor.

4. An apparatus as claimed in claim 3 including an open-end tubular member movable into end abutting relation with the floor, the tubular member, when abutting with the floor, forming, together with the floor, the first chamber.

5. An apparatus for brewing a beverage as claimed in claim 4 wherein the floor comprises a perforated base plate covered with a filter which is permeable to gas and liquid but impermeable to ground material, said filter comprising a strip having a width greater than the width of the tubular member and adapted to be clamped to the base plate when the tubular member is moved down to form the first chamber, and means for moving the filter strip to present a clean surface in preparation for a second brewing cycle when the tubular member is moved away from the floor.

6. An apparatus as claimed in claim 4 wherein the floor comprises a micromesh filter screen and the apparatus includes means for removing used ground material from the screen after the beverage has been withdrawn from the first upper chamber.

7. An apparatus for brewing a beverage as claimed in claim 1 wherein the floor comprises a perforated base plate covered with a filter which is permeable to gas and liquid but impermeable to ground material.

8. An apparatus as claimed in claim 7 wherein the ends of both the tubular member and the second chamber located adjacent either side of the floor, and the base plate comprising part of the floor, are rectangular in cross-section.

9. An apparatus for brewing a beverage as claimed in claim 1 wherein the partial area of the floor which is permeable to gas and liquid and impermeable to said beverage material is rectangular in shape.

10. Apparatus for brewing a beverage from hot water and brewable ground material comprising:
a first chamber having a peripheral wall,
a floor permeable to gas and liquid and impermeable to said ground material adapted to make sealing contact with said wall, and access means to said chamber for atmospheric air and for controlled aliquots of ground material and hot water,
a second chamber upwardly open to and in sealing contact with said floor,
means (a) for supplying said aliquots to said first chamber substantially simultaneously,
means (b) for applying a superatmospheric pressure to said second chamber to blow air through the floor and into the first chamber to agitate the brew,
means (c) for applying a subatmospheric pressure in said second chamber sufficient to separate brewed liquid from waste ground material and to draw such liquid through said floor into said second chamber,
means (d) for dispensing extracted liquid from said second chamber, and
means for operating said means (a), means (b), means (c) and means (d) successively with means (c) commencing after a predetermined extraction period and means (d) commencing after substantially complete separation of said brewed liquid from said waste ground material.

11. Apparatus as claimed in claim 10 wherein said operating means is arranged to operate means (a), means (b), means (c) and means (d) in a continuous cycle.

12. Apparatus as claimed in claim 11 wherein said second chamber comprises a vertical cylinder, and a piston slideable in said cylinder and forming the floor thereof, said operating means being arranged to move said piston upwardly at least a small amount to create said superatmospheric pressure and thereafter to move the piston downwardly to create said subatmospheric pressure within said cylinder.

13. Apparatus as claimed in claim 12 wherein said cylinder has an outlet in its side wall at a position spaced from said floor, the cylinder volume between said floor and the level of said outlet being sufficient to contain the liquid of said aliquot, the apparatus including means for moving said piston from a top position adjacent said floor to a bottom position uncovering said outlet so as to apply said subatmospheric pressure and dispense said brewed liquid through said outlet.

14. Apparatus as claimed in claim 13 including:
a motor,
a crankshaft rotatable by said motor and connected to said piston for reciprocation thereof between said top and bottom positions,
wherein said first chamber wall is displaceable to admit atmospheric air under said chamber wall and to allow removal of said waste ground material, the apparatus further comprising:
cam means rotatable with said crankshaft, and
cam follower means arranged to maintain said first chamber wall, floor and second chamber in sealing contact from commencement of the piston downstroke to the uncovering of said outlet, and to displace said wall during the uncovering of said outlet and during at least part of the unstroke of said piston.

15. Apparatus as claimed in claim 14 further comprising:
a supply of filter paper in the form of a continuous band, said floor including a foraminous support for said paper,
means for feeding said paper over said support including a rotatable drum downstream of said support and releasable means for holding said paper against said drum,
said cam and cam follower means being arranged to engage said holding means during at least part of that piston cycle portion which includes the uncovering of said outlet and part of the upstroke, whereby said waste ground material is conveyed away from said first chamber underneath the raised peripheral wall of such chamber.

16. Apparatus as claimed in claim 10 further comprising means (e) for removing said waste ground material from said first chamber, said operating means being arranged to commence operation of means (e) approximately simultaneously with means (d).

References Cited
UNITED STATES PATENTS

| | | | |
|---|---|---|---|
| 2,312,555 | 3/1943 | Jepson | 99—292 |
| 2,935,011 | 5/1960 | Perlman | 99—289 |
| 3,356,011 | 12/1967 | Parraga | 99—302 |
| 3,370,523 | 2/1968 | Wright | 99—289X |

ROBERT W. JENKINS, Primary Examiner

U.S. Cl. X.R.

99—287